United States Patent [19]
Roberts et al.

[11] Patent Number: 5,367,458
[45] Date of Patent: Nov. 22, 1994

[54] APPARATUS AND METHOD FOR IDENTIFYING SCANNED REFLECTIVE ANONYMOUS TARGETS

[75] Inventors: Malcolm T. Roberts, Oadby; Russell W. Miles, Rugby, both of England

[73] Assignee: Caterpillar Industrial Inc., Mentor, Ohio

[21] Appl. No.: 104,867

[22] Filed: Aug. 10, 1993

[51] Int. Cl.$^5$ .......................... G06F 15/50; B62D 6/00
[52] U.S. Cl. ............... 364/424.02; 180/169; 901/1; 364/449; 250/563; 250/561; 356/1; 356/375
[58] Field of Search ............ 364/424.02, 449, 559, 364/561, 513; 250/563, 561; 180/169; 356/1, 375, 152; 901/47, 1

[56] References Cited

U.S. PATENT DOCUMENTS

| | | | |
|---|---|---|---|
| 4,225,226 | 9/1980 | Davidson et al. | 356/1 |
| 4,328,545 | 5/1982 | Halsall et al. | 364/424.02 |
| 4,647,784 | 3/1987 | Stephens | 250/561 |
| 4,700,301 | 10/1987 | Dyke | 364/424.02 |
| 4,727,492 | 2/1988 | Reeve et al. | 364/424 |
| 4,729,660 | 3/1988 | Tsumura et al. | 356/375 |
| 4,796,198 | 1/1989 | Boultinghouse et al. | 364/513 |
| 4,811,228 | 3/1989 | Hyyppa | 364/424.02 |
| 4,817,000 | 3/1989 | Eberhardt | 364/443 |
| 4,846,297 | 7/1989 | Field et al. | 180/169 |
| 4,847,769 | 7/1989 | Reeve | 364/424.02 |
| 4,903,054 | 2/1990 | Wible | 250/561 |
| 4,918,607 | 4/1990 | Wible | 364/424.02 |
| 5,005,128 | 4/1991 | Robins et al. | 364/424.02 |
| 5,068,795 | 11/1991 | Kamimura et al. | 364/449 |
| 5,255,195 | 10/1993 | Mochizuki et al. | 364/449 |

OTHER PUBLICATIONS

"An Experimental System for Automatic Guidance of Ground Vehicle Following the Commanded Guidance Route on Map", Tsumura et al., pp. 2425-2430, IFAC Control Science and Technology, 1981.

"Automated Vehicle Guidance—Commanded Map Routing", Tsumura et al., pp. 62-67, IEEE, 1982.

"An Experimental System for Processing Movement Information of Vehicle", Tsumura et al., pp. 163-168, no date.

"Position Finding of Ground Vehicle by Use of Laser Beam and Corner–Cubes", Tsumura et al., pp. 348-355, IEEE, 1982.

"Tracking and Data Association", Bar-Shalom et al., 192-195, Academic Press, Inc., 1988.

*Primary Examiner*—Thomas G. Black
*Assistant Examiner*—Julie D. Day
*Attorney, Agent, or Firm*—Alan J. Hickman

[57] ABSTRACT

A method and apparatus for verifying the identity of an observed anonymous target 16 from a plurality of anonymous reflective targets 16 positioned at predetermined spaced apart locations within an area 14 of operation of an automatic guided vehicle 10 is provided. The anonymous targets 16 each have a predetermined width and a predetermined orientation angle. A dead reckoning system 78 and scanner 12 on the vehicle 10 each deliver signals to the onboard computer 52. The onboard computer 52 processes the signals in accordance with preprogrammed instructions and corrects the position and heading of the vehicle 10 based on the sensed position of the reflected electromagnetic radiation delivered from the spaced anonymous targets 16. The onboard computer 52 verifies the identity of the reflecting anonymous targets 16 through an incident and subtended angle analysis which considers the orientation and width of the anonymous targets 16.

24 Claims, 9 Drawing Sheets

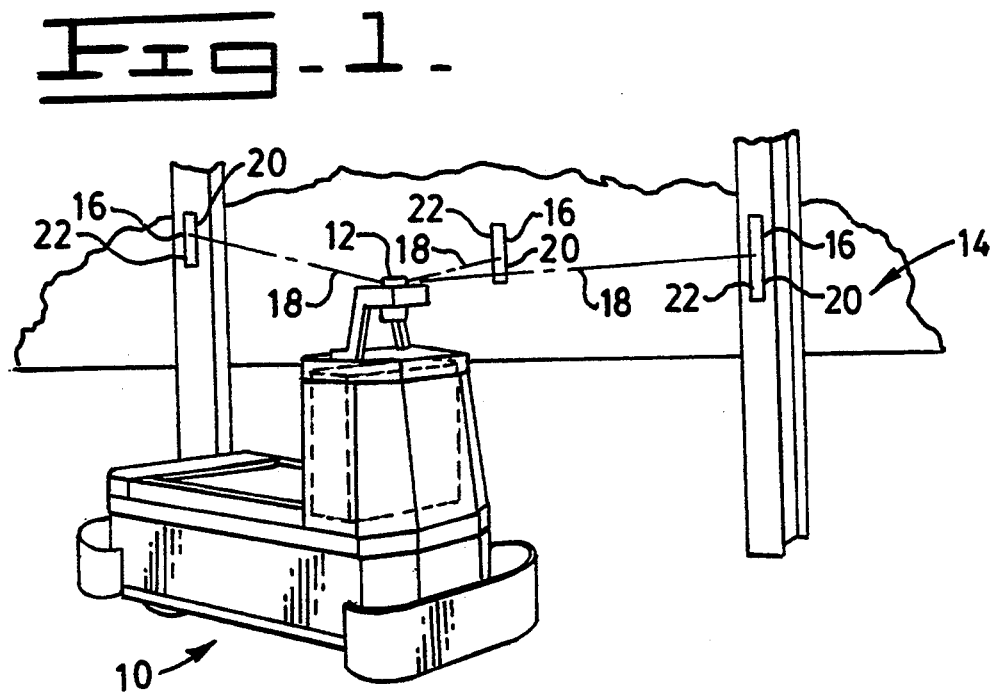
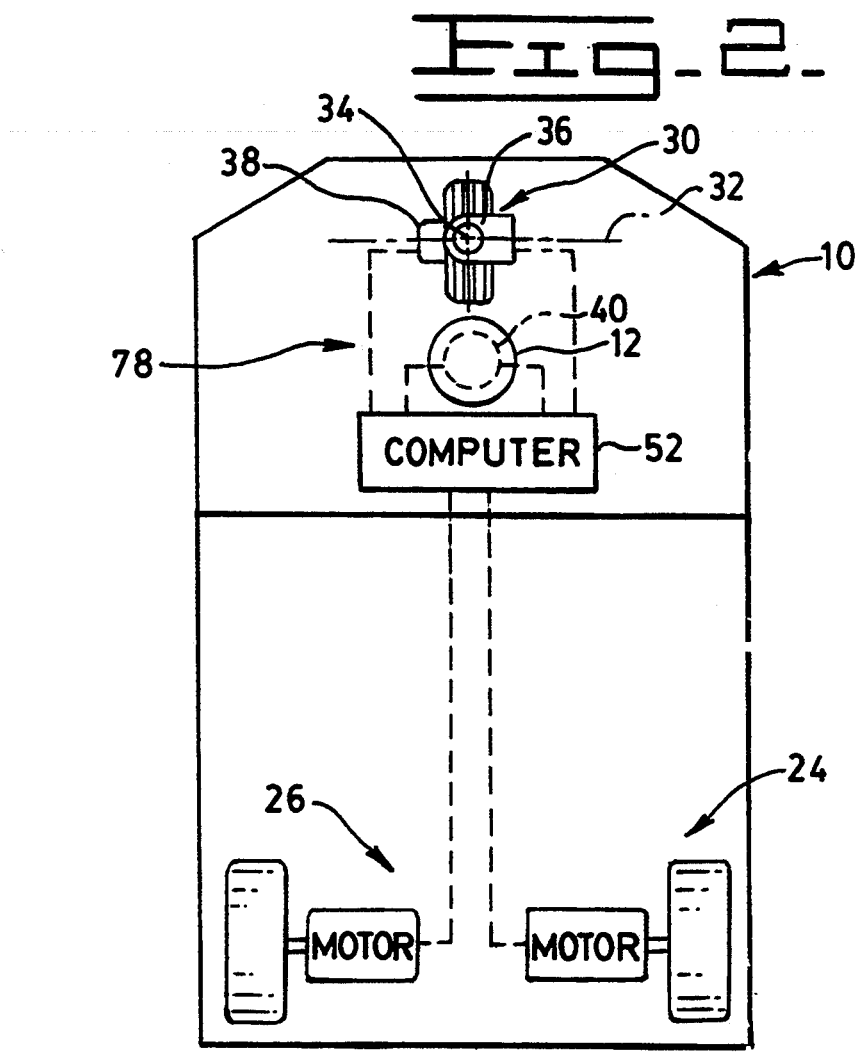

Fig_6.

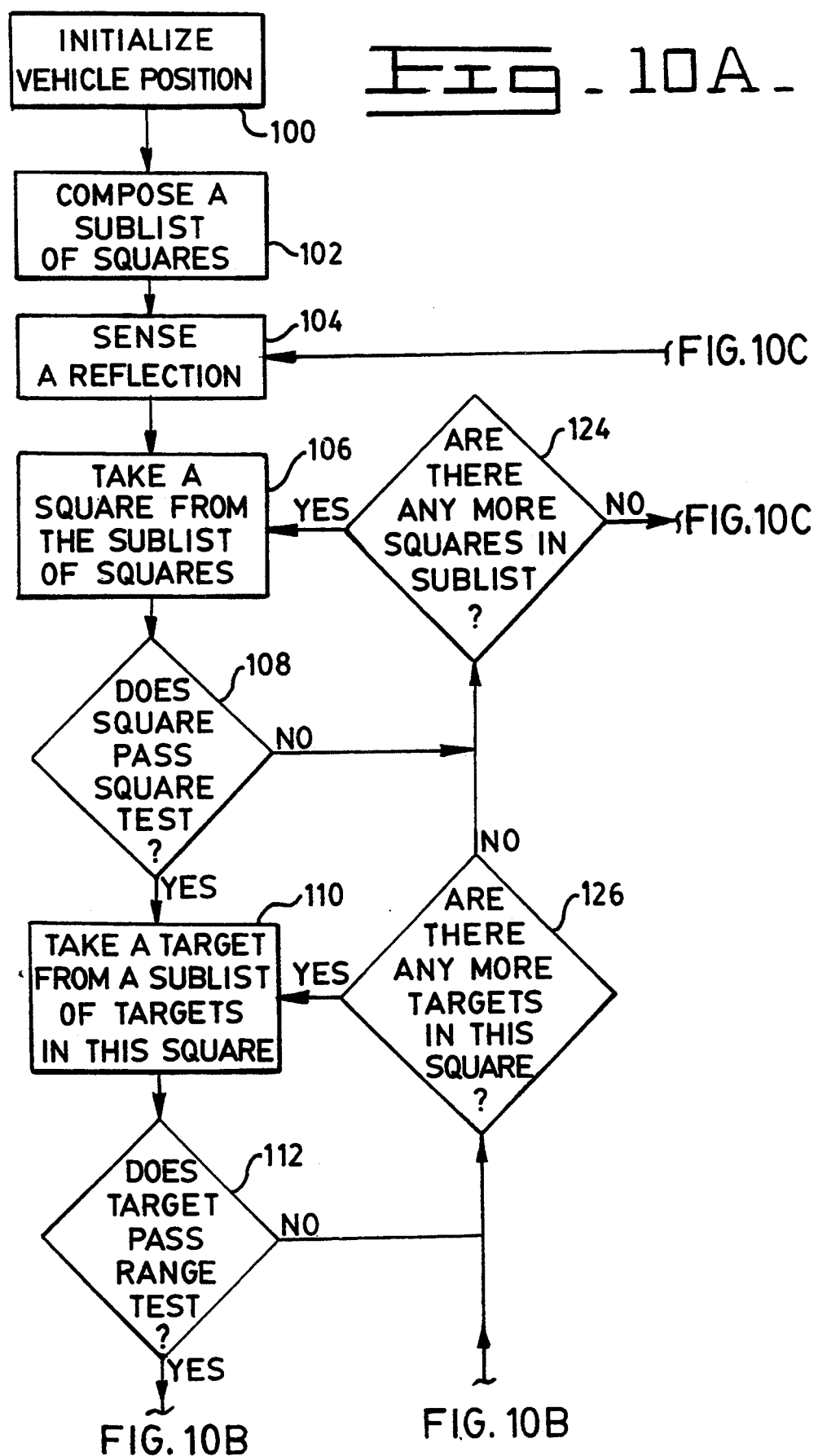

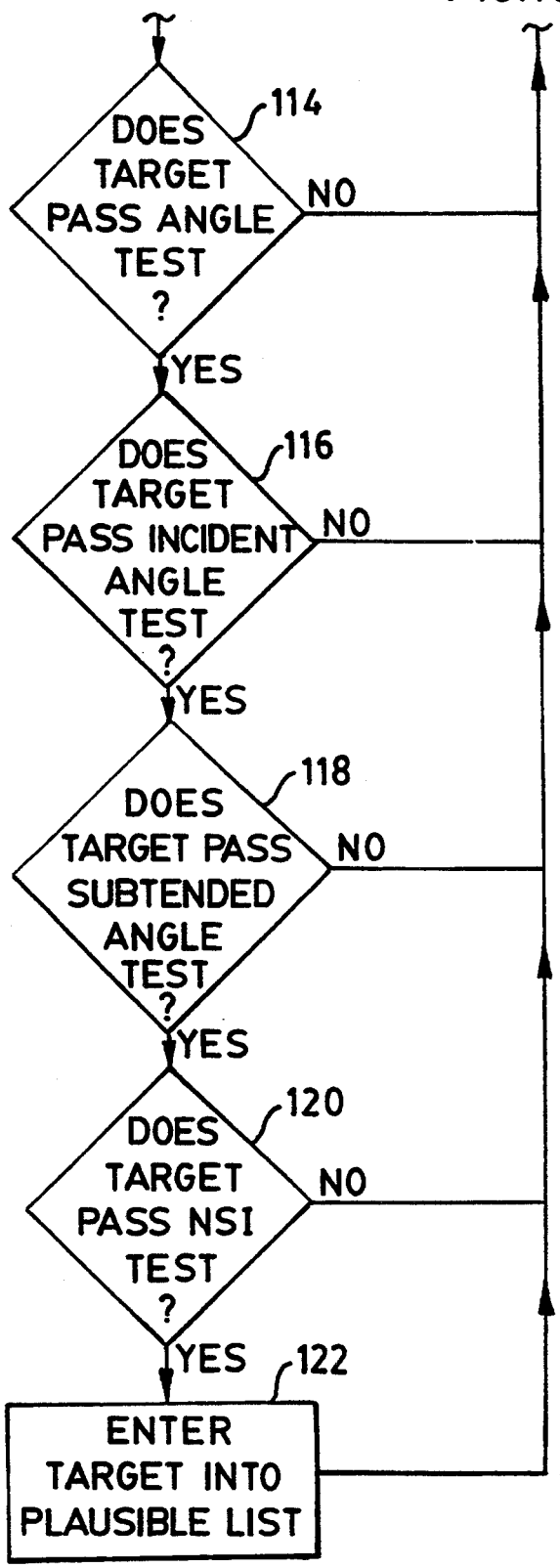

APPARATUS AND METHOD FOR IDENTIFYING SCANNED REFLECTIVE ANONYMOUS TARGETS

TECHNICAL FIELD

This invention relates to a method and apparatus for identifying a reflective anonymous target from a plurality of reflective anonymous targets during scanning of the anonymous targets from an automatic guided vehicle.

BACKGROUND ART

Automatic guided vehicles have been used for many years to transport goods in warehouses, machine shops, assembly facilities and the like. These vehicles normally have guidance, navigation, and vehicle control systems which enable the vehicle to maneuver through the facility with a relatively high degree of accuracy. These guidance systems often have dead reckoning capabilities which assists the vehicle to operate autonomously and without the aid of any external means such as stripes or wires on the floor.

Dead reckoning systems normally include a steer angle transducer such as an encoder to measure the steering angle of the vehicles steerable wheel and a ground engaging wheel transducer such as a resolver for measuring travel of the vehicle along the underlying surface. These two transducers provide information to an onboard guidance computer which processes the information in accordance with preprogrammed instructions related to a vehicle travel plan such as; heading, speed, and the like, and controls the operation of the vehicle steering and drive control systems. Such dead reckoning systems typically provide acceptable operation for short distances. However, in more complex and long run applications there is a need to provide information to the onboard computer to facilitate corrections and return the vehicle from the actual path of travel to the planned path of travel. This deviation from the planned path of travel is caused by anomalies in the operation of the system. For example, slipping or wear of the ground engaging or steerable wheels, unevenness of the underlying surface of operation of the vehicle and other such factors.

One approach to accurately determining vehicle location is disclosed in U.S. Pat. No. 4,647,784 to P. E. Stephens, dated Mar. 3, 1987. This patent teaches the use of a plurality of reflective bar coded targets placed at predetermined spaced apart locations within an area of operation of the vehicle. The targets are read by a laser scanner and through triangulation the measured location and heading of the vehicle within a particular area of operation is determined. This information is used to make minor corrections to the path of vehicle travel. Because the coded targets are distinguishable from each other the processing of data is accelerated.

U.S. Pat. No. 4,727,492 to P. J. Reeves et al. discloses an automatic guided vehicle having a combination of the laser scanner for reading a plurality of spaced identifiable retroreflective bar coded targets and a dead reckoning system for guiding the vehicle as it travels along a preselected path stored in the memory of a guidance computer. The measured position of the scanned targets is used to correct the estimated position and heading of the vehicle as determined by dead reckoning. The Kalman filter process is utilized to provide the estimated vehicle position. Because the targets are distinct the data processor is able to disregard reflections from other objects or other targets and concentrate processing on the relevant information. This requires that each target be of a substantial size, a size capable of displaying a predetermined number of strips of spaced reflective material of adequate width. Also, placement of the coded targets must be carefully controlled such that two targets with the same code cannot be within range of the scanner at the same time.

As data processing speed and memory capacity have increased over the years attempts have been made to provide a laser scanning navigation system with anonymous reflective targets (non-coded targets). One such system is disclosed in U.S. Pat. No. 4,811,228 to Kaievi Hyyppa dated Mar. 7, 1989. In Hyyppa the vehicle utilizes sensors on the wheels and steering mechanism to measure steering angle and distance traveled which is processed by the onboard computer to calculate the estimated change in position and heading of the vehicle. Hyyppa also discloses a plurality of single strip targets arranged at preselected locations within the area of operation of the automatic guided vehicle. The position of each target is stored in a land base computer and downloaded to an onboard computer of the vehicle as points. Initialization of the vehicle is accomplished, for example, by locating the vehicle at a predetermined position and heading relative to the points (targets). This position is a basis for subsequent calculations and target-point association. The laser scanner scans the area and senses the position of the sighted targets based on an angle measurement of the reflected light relative to the vehicle (heading). The onboard computer, using conventional trigonometry, calculates the position and direction of the truck based on the sensed position. Since the targets are anonymous and there may be more than 3 observed targets and other non-target reflections it is necessary to determine if the reflection came from one of the targets and which target it came from. This verification is called target association. This association utilizes angle measurements of the scanner based on the previous position and heading of the truck. Because there are many targets and the association between targets and points takes a substantial amount of processing time the accuracy of operation of the vehicle may be adversely affected. Further the dynamics of movement of the vehicle further complicates the point-target association. Even in view of the recent advances in computer technology and the speed of operation of such computers complete data processing is not always possible.

Should there be several targets somewhat aligned along the sight line of the laser scanner, clumped together in different facing directions or overlapping the aforementioned association by sensing, the angle of reflection of the laser signal does not provide enough distinction between points (targets) to enable an accurate target-point association to be made. As a result, a substantial amount of processing time may be spent in the association without any confidence that the results are accurate. This inaccuracy results in additional vehicle position and heading error which further compounds the above identified error.

Further inaccuracy is built into the system based on error in the scanner, error in the scanner angle sensors, steering angle and travel distance error and the like. This error affects the position and heading calculations of the vehicle and causes additional errors in the navigation of the vehicle.

The present invention is directed to overcoming one or more of the problems as set forth above.

DISCLOSURE OF THE INVENTION

In one aspect of the present invention, a method for verifying the identity of an observed anonymous target from a plurality of anonymous targets positioned at predetermined spaced apart locations within an area of operation of an autonomous unmanned vehicle (automatic guided vehicle). The vehicle has a scanner and the scanner is adapted to deliver electromagnetic radiation. The anonymous targets have a substantially planar reflective upright surface and a predetermined width defined by spaced first and second upright edges. The anonymous targets are each oriented at a preselected angle relative to predetermined coordinates. The anonymous targets are adapted to reflect the delivered electromagnetic radiation and the scanner is adapted to receive the reflected electromagnetic radiation and deliver a signal in response to receiving the reflected electromagnetic radiation. The scanner includes means for sensing the angular position of the scanner relative to some known point on the scanner. The automatic guided vehicle having an onboard computer. The computer has a memory and is adapted to process signals delivered from the scanner according to preprogrammed instructions. The predetermined location, orientation, and width of each anonymous target is stored in memory. The vehicle has a dead reckoning means for sensing the position of the vehicle and delivering responsive dead reckoning signals. The computer is adapted to receive the dead reckoning signals and process the dead reckoning signals according to preprogrammed instructions, the method comprises: measuring one of a subtended angle and width of the first anonymous target reflecting the electromagnetic radiation; calculating one of a subtended angle and width of a related anonymous target selected from memory as a function of the estimated vehicle position and the predetermined target position; comparing one of the measured width and subtended angle of the first anonymous target with a respective one of the calculated width and subtended angle of the related anonymous target and verifying that the compared one of the width and subtended angle of the first anonymous target and related anonymous target being within a predetermined relative tolerance range of each other; and storing an identity of the first target in a plausible target list in the computer.

In another aspect of the present invention, the method includes the steps of: calculating an incident angle of reflection of the first anonymous target as a function of one of a measured and an estimated bearing angle of the anonymous target, the orientation of a related anonymous target stored in memory, and an estimated heading of the vehicle; comparing the calculated incident angle with a predetermined incident angle maximum value; and preforming the one subtended angle and width calculation and measurement in response to the calculated incident angle being less than the incident angle maximum value.

In another aspect of the present invention an automatic guided vehicle, comprises a plurality of anonymous targets positioned at predetermined spaced apart locations within an area of operation of the automatic guided vehicle. The targets each have a substantially planar reflective upright surface and a predetermined width defined by spaced first and second upright edges. The targets are each oriented at a preselected angle relative to predetermined coordinates and adapted to reflect the delivered electromagnetic radiation. A scanner, rotatable about an upright axis, delivers electromagnetic radiation, receives a reflection of the electromagnetic radiation, and delivers a signal in response to receiving the reflected electromagnetic radiation. An encoder means connected to the scanner delivers an angle signal responsive to the rotated position of the scanner. A dead reckoning means senses the direction and distance of travel of the vehicle and delivers a responsive dead reckoning signal. A computer mounted onboard the vehicle is connected to receive the signals from the scanner, encoder means, and dead reckoning means. The computer has a memory and a processor and is adapted to process signals delivered from the scanner, encoder, and dead reckoning means according to preprogrammed instructions. The predetermined location, orientation, and width of each anonymous target is stored in memory. The computer calculates one of a subtended angle and a width of a first anonymous target reflecting said electromagnetic radiation based on the scanner and encoder signals. The computer then calculates one of a subtended angle and width of a related anonymous target selected from memory as a function of the estimated vehicle position based on the signals from the dead reckoning means. The computer compares one of the measured width and subtended angle of the first anonymous target with a respective one of the calculated width and subtended angle of the related anonymous target and verifies that the compared one of the width and subtended angle of the first anonymous target and related anonymous target are within a predetermined relative tolerance range of each other and stores an identity of the first target in a plausible target list in said computer.

In another aspect of the present invention, a computer onboard an automatic guided vehicle calculates an incident angle of reflection of the first anonymous target as a function of one of a measured bearing angle of the first anonymous target and an estimated bearing angle of the related anonymous target, compares the calculated incident angle with a predetermined incident angle maximum value, and performs the one subtended angle and width calculation and measurement in response to the calculated incident angle being smaller than the incident angle maximum value.

This invention relates to a navigation system for autonomous unmanned vehicles. Navigation in this context is the estimation of the position of the vehicle. The invention provides a method and apparatus for determining the source of a reflected signal from a rotating light beam scanner in a manner which uniquely identifies this source from a list of possible sources.

BRIEF DESCRIPTION OF THE DRAWINGS

FIG. 1 is a diagrammatic isometric view of an embodiment of the present invention showing an automatic guided vehicle operating within an area having a plurality of anonymous single stripe targets;

FIG. 2 is a diagrammatic schematic plan view of the vehicle showing the operating systems of the vehicle;

FIGS. 10A-C, is a diagrammatic flow chart showing of the steps processed by the onboard computer in making a target association.

BEST MODE FOR CARRYING OUT THE INVENTION

Figure 3:
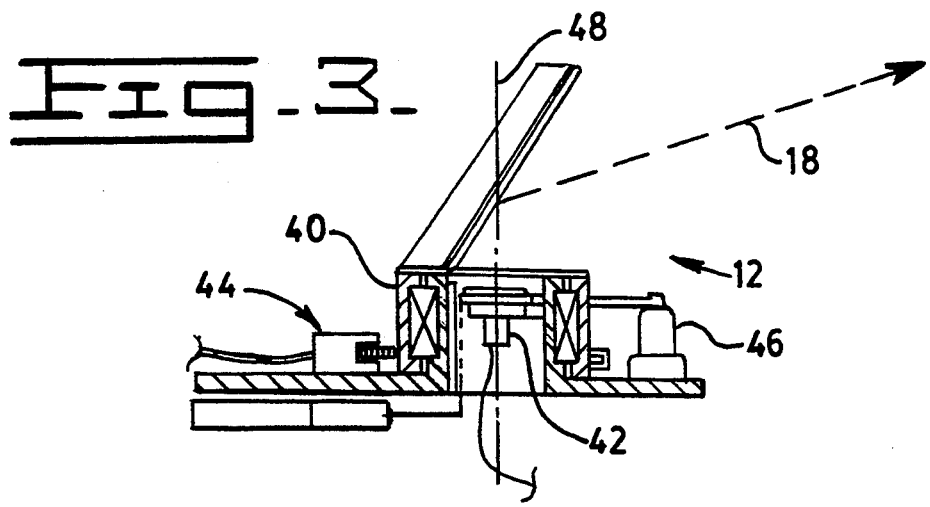
FIG. 3 is a diagrammatic crossectional view of a rotatable scanner for delivering electromagnetic radiation and for receiving a reflection of electromagnetic radiation.

With reference to the drawings, and particularly FIG. 1, an automatic guided vehicle (AGV) 10 is shown. A scanner 12 is mounted on an upper portion of the vehicle 10. The scanner 12 is a rotatable scanner capable of delivering electromagnetic radiation and receiving a reflection of said electromagnetic radiation. The scanner is preferably a laser scanner and delivers a pencil beam, however, other types of scanners are considered suitable substitutes and within the scope and spirit of the invention. The automatic guided vehicle 10 operates within an area 14, such as a warehouse, factory and other such facilities. A plurality of spaced apart anonymous targets 16 are mounted at predetermined locations within the area 14 of operation of the vehicle 10. The targets 16 are positioned at an elevation so that a central axis 18 of the laser beam delivered by the scanner 12 is aligned to intersect the targets 16 as the scanner rotates.

The targets 16 are retroreflective and include, for example, a single strip of retroreflective material or a plurality of abutted strips of retroreflective material forming a substantially continuous retroreflective target. The targets 16 are substantially identical, without any identification or coding, and therefore anonymous. The retroreflective targets are preferably flat, and rectangular in shape. The retroreflective target length and width has been preselected so as to adequately reflect the laser beam delivered from the scanner during operating conditions. For example, the surface conditions of the floor affect the attitude of the laser beam. Thus, the length of the retroreflective target surface must be adequate to accommodate variations in elevational beam angle caused by such factors. An appropriate length is between 18 inches (45.72 cm) and 36 inches (91.4 cm). The retroreflective target 16 has first and second spaced substantially parallel edges 20, 22 defining opposite ends of the anonymous reflective targets 16 and the effective target width. In particular the distance between the first and second edges is 1.77 inches (45 mm). The width of the target 16 is important and used in determining the identity of the observed target during travel of the vehicle 10 within the predefined area. The bearing angle of the anonymous targets 16, as viewed in an plane having X-Y coordinates substantially parallel to the underlying surface upon which the vehicle travels and normal to a vertical axis of the target, is important and included in the subsequent determination of the target identity being discussed. For example, the bearing of the targets and the width of the targets relative to the vehicle are primary considerations in determining the validity of a anonymous target such as by incident and subtended angle calculations. Further, the retroreflective target being substantially flat reduces complexities introduced by other shapes and facilitates ease of calculating an incident angle of the target. These calculations and others will be subsequently discussed in greater detail.

Figure 4:
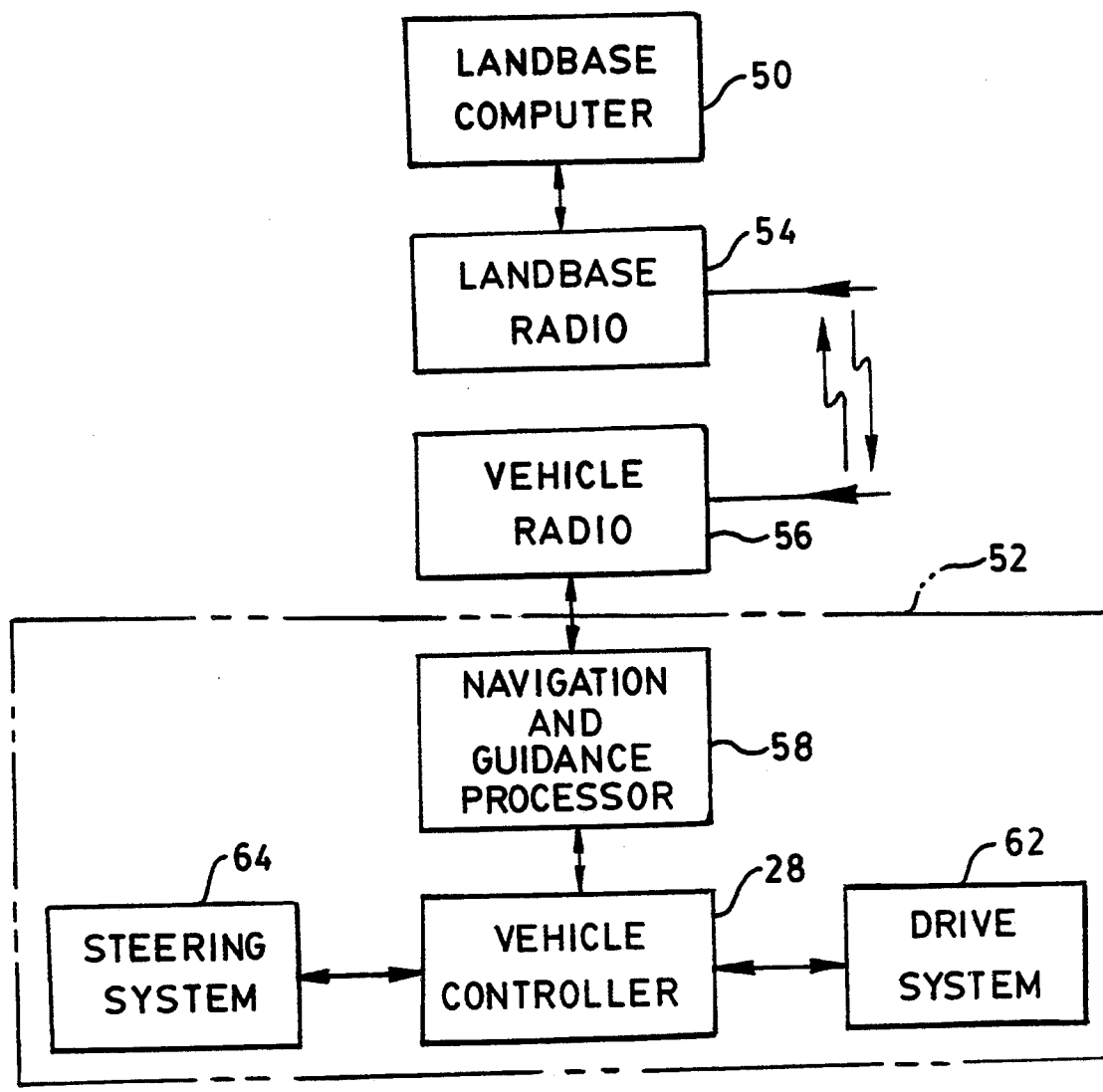
FIG. 4 is a block diagram of the control, drive, and steering systems of the vehicle.

The automatic guided vehicle has a drive system 62 (FIG. 4). The drive system 62 has pair of drive wheels 24 (FIG. 2) and a pair of drive motors 26 connected to rotate the drive wheels 24. The drive wheels 24 are located at one end portion of the vehicle 10. A vehicle controller 28 which is connected to the drive system 62 and selectively controls delivery of electrical energy to the motors 26. The vehicle controller 28 is effective to cause powered rotation of the wheels 24 in the same or opposite directions and at the same or different speeds. Thus, it is possible to effect the direction of travel of the vehicle by the vehicle controller 28. For example, by counterrotating the wheels 24 at the same speed pivot steering of the vehicle is achieved. Vehicle controllers of this type are well known in the art and therefore will not be discussed in any greater detail.

A steering system (FIG. 4) having a steerable wheel 30 (FIG. 2) rotatable about a substantially horizontal axis 32 is pivotally mounted on an end portion of the vehicle 10 opposite the drive wheels 24. The steerable wheel 30 is steered in response to pivotable movement of the steerable wheel 30 about an upright axis 34 extending transverse the horizontal axis 32. An actuator of either the linear or rotary type (not shown), pivots the steerable wheel 30 about the upright axis 34. The vehicle controller 28 is effective to selectively control the delivery of electric current to the actuator and thereby cause pivotal movement of the steerable wheel 30 about the upright axis 34.

A steering angle transducer 36, such as an encoder or other suitable sensor is connected to the steerable wheel 30 and senses pivotable movement of the steerable wheel about the upright axis 34. The steering angle transducer 36 delivers digital signals representing the steered angle of the steerable wheel 30 which determines the ultimate heading of the vehicle 10. This feedback information is used in the dead reckoning of the vehicle 10, autonomous operation of the vehicle 10 without assistance from external devices, such as, wires, reflective tape and other markers on the floor of the operating area 14 or by human intervention.

A wheel rotational position sensor 38, for example, a resolver, is connected to the steerable wheel 30 and rotatable in response to rotation of the wheel 30. The rotation sensor 36 measures wheel rotation and delivers control signals responsive to the rotated wheel position, the distance the wheel has traveled. This information is utilized in vehicle dead reckoning control. To simplify discussion, the wheel rotation position and steering angle signals will be referred to as dead reckoning signals. It should be noted that other sensors such as gyroscopes, accelerometers, and the like are considered suitable substitutes and within the scope of the invention. Further, the use of any of the above mentioned sensors to indirectly provide input for affecting drive and steering control is considered an equivalent to the dead reckoning sensors discussed herein.

Dead reckoning may also be achieved by calculating or assuming a heading and position over time given a starting point and pre-planned path. Thus, for example, given a known position (such as at initialization of the vehicle) and a pre-planned path (such as represented by a polynomial equation) an estimated position and heading of the vehicle may be calculated at preselected time increments.

As best seen in FIG. 3, the scanner 12 includes a rotating scanner head 40 which directs electromagnetic radiation emitted from a laser, and a receiver such as a photodetector 42 which receives a reflection of the emitted electromagnetic radiation. The reflected beam is received when the delivered beam passes across the reflected target portion located between the first and second edges 20, 22. The scanner delivers a digital signal in response to the photodetector receiving the reflected electromagnetic radiation. The signal is "on" (+) when a reflection is received and "off" (−) in the absence of a reflection. A means 44 is provided for sensing the angle of rotation of the scanner 12. The means 44 preferably includes an encoder connected to the scanner 12. The encoder 44 delivers data count and marker signals. A motor 46 rotates the scanner head 40 about an elevationally oriented scanner axis 48. As previously mentioned, the electromagnetic radiation is preferably a pencil laser beam emitted along the axis 18. Axis 18 is oriented transverse the scanner axis 48. In order to simplify subsequent discussion the signals of this paragraph will be referred to as scanner signals.

Referring to FIG. 4, a landbase computer 50 is a high level computer provided for controlling the allocation and routing of the AGV, collision avoidance, road system management, communications with the systems operator and interface with supervisory equipment. Target survey information including position and orientation are entered graphically into a graphics terminal (not shown) and transferred to the landbase computer 50. This information in the form of position (x,y coordinates) and orientation (angle) may also be entered into the landbase computer 50 or other available input devices. It should be noted that this information may be entered in the graphics, land base or onboard computer 52.

A computer 52 located onboard the vehicle 10 communicates with the landbase computer 50 by way of landbase and vehicle radios 54, 56. This enables information and instructions such as target position and orientation stored in the landbase computer to be transmitted to the onboard computer 52. Computer 52 is responsible for controlling the operation of the AGV in accordance with preprogrammed instructions. The onboard computer 52 referred to herein includes a navigation and guidance processor 58 and the vehicle controller 28. The vehicle controller 28 communicates with the drive and steering systems 62, 64 and controls the operation thereof based on preprogrammed instructions and commands received from the navigation and guidance processor 58.

The navigation and guidance processor 58 controls operation of the vehicle in response to scanner signals, dead reckoning signals, knowledge of how the vehicle moves and other preprogrammed instructions stored in memory, including those downloaded from the landbase computer. The navigation and guidance processor 58 has an EPROM and battery backed memory to provide the flexibility of controlling application dependent equipment. The battery backed memory allows the end user to preprogram application specific functions in ladder logic. The navigation and guidance processor 58 runs the ladder diagram program. The vehicle controller 28 handles the special guidance functions which maneuvers the vehicle 10 on the predetermined path.

Figure 5:
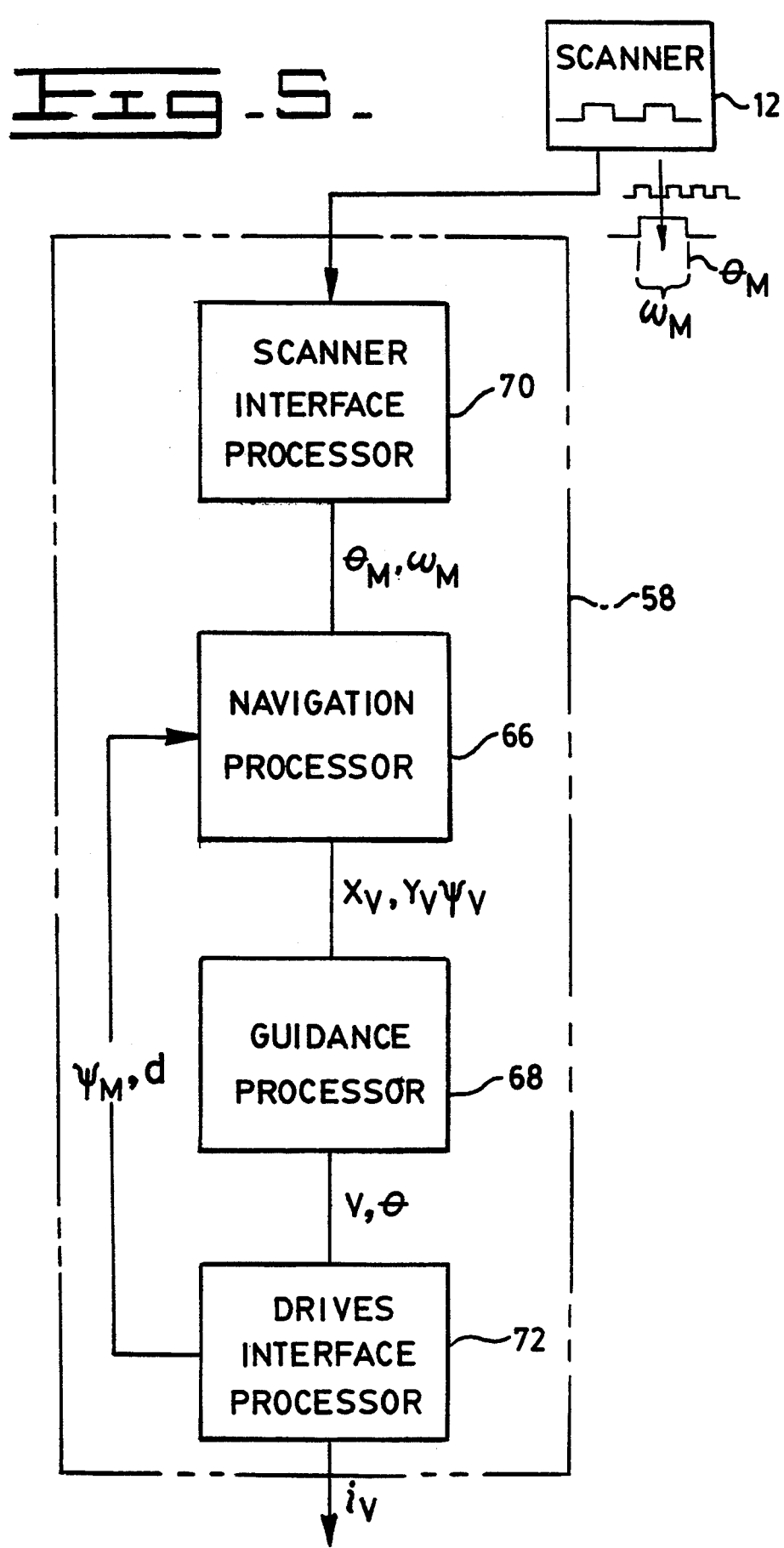
FIG. 5 is a diagrammatic representation of the navigation and guidance processor.

Since the vehicle 10 is free ranging, not restricted in operation to a fixed path defined by wires, rails, and reflective strips or the like on the floor, it must be able to navigate and guide itself. As best seen in FIG. 5, the navigation and guidance processor 58 has a navigation processor portion 66 and a guidance processor portion 68. The navigation processor portion 66 combines dead reckoning and triangulation information to calculate the vehicle position. The aforementioned dead reckoning signals and vehicle movement characteristics (preprogrammed) are used to determine the estimated position and heading of the vehicle 10. Since this information is subject to error for the reasons discussed above, e.g., uneven floors, changes in measuring wheel radii due to wheel wear and vehicle loading, and wheel slippage, periodic correction is required. The laser scanner 12 and anonymous targets 16 provide information necessary in the correction of this error. The surveyed position of the anonymous targets 12 is stored in the navigation processor portion 66.

The laser scanner 12 delivers the scanner signals to a scanner interface processor 70. The scanner interface processor 70 is connected to the navigation processor 66 by a ribbon cable. The scanner interface processor 70 determines the sensed angle of the anonymous target seen and delivers this information to the navigation processor 66.

The guidance processor portion 68 controls the direction and speed of operation of the vehicle 10 based on route information received over radio link from the landbase computer 50 and generates steering angle and speed commands. The route consists of a plurality of X-Y coordinates and speed limits. The guidance processor portion 68 generates smooth curves between X-Y coordinate positions along the guide path for the vehicle 10 to follow.

A drives interface processor 72 is the basic input/output highway between the guidance processor portion 68 and the vehicle controller 28. Physically, a ribbon cable connects the processor 72 to the vehicle controller and provides bidirectional communication between the navigation and guidance processor 58 and the vehicle controller 28. Distance wheel rotation, steering angle feedback, and speed and steer angle commands are sent over this data link.

Referring to FIG. 4, the vehicle controller 28 is connected to the steering system 64 and the drive system 62. The vehicle controller includes a pair of microprocessors (not shown) one which controls the vehicle steering system 64 and the other which controls the drive system 62. Specifically, the microprocessors control the main power circuits (not shown) of the drive and steering systems. Since the main power circuits of a suitable type are well known in the art further discussion concerning the specific construction thereof will not be provided herein. It is to noted that the vehicle controller provides the navigation and guidance processor 58 with dead reckoning signal feedback as well as other feedback from the steering and drive systems 64, 62.

In an environment of the type disclosed, the targets 16 are anonymous. It is necessary to determine if the electromagnetic radiation being received by the scanner 12 is from a valid anonymous target 16, and from which target it is being reflected. Since the targets 16 are anonymous, the reflected signal must be identified in order to accurately navigate the vehicle 10. Vehicle position and heading corrections based on erroneous reflections can be detrimental to the accurate operation of the vehicle. Thus, it is important that an observed target is correctly associated with an anonymous target 16 held in the memory of the computer 52.

Since the number of anonymous targets 16 within the area of operation of the vehicle 10 is substantial, it is unlikely that the navigation and guidance processor 58 can timely process the data associated with the reflected signals. Thus, the actual path of vehicle travel would be erratic and deviate from the tautological path of vehicle travel. The navigation and guidance processor 58 accelerates the processing of the scanner signals by a multi-step process. The multi-step process includes a plurality of tests which confirms that the reflection is from an anonymous target 16, determines the identity of the target, and discards a target from further testing at the time a given test has failed. Therefore, not all the steps will be carried out for a target given should a particular test fail before completion of all the steps. By early elimination of unlikely anonymous targets 16 a larger number of reflections may be processed for a given period of time.

Accurately guiding the vehicle 10 along the desired path includes the process of estimating the position and heading of the vehicle 10 based on dead reckoning signals and movement of the vehicle 10 from an initialized position and subsequent corrected positions. This process is carried out in the onboard computer 52. The onboard computer 52, the steering angle transducer 36, and the wheel rotary position sensor 38 combined define the dead reckoning means 78. Since the position and heading estimation techniques of the vehicle 10 using dead reckoning signals are known in the art further detailed discussion will be omitted.

A first step in the operation of the automatic guided vehicle 10 involves initialization of the vehicle. 10. This is achieved for example by parking the vehicle 10 at a preselected initial position and heading. Scanning the area for anonymous targets 16. Measuring the bearing angle of the anonymous targets 16. Determining vehicle position and heading using triangulation and storing the confirmed vehicle position measured in the onboard computer 52. In such initialization the vehicle 10 will sense between 3 and 8 anonymous targets 16 and calculate its position based on at least three of the anonymous targets 16. The subsequent discussion relates primarily to dynamic operation of the vehicle 10. However, the discussion may also apply to the static initialization sequence described above.

Figure 6:
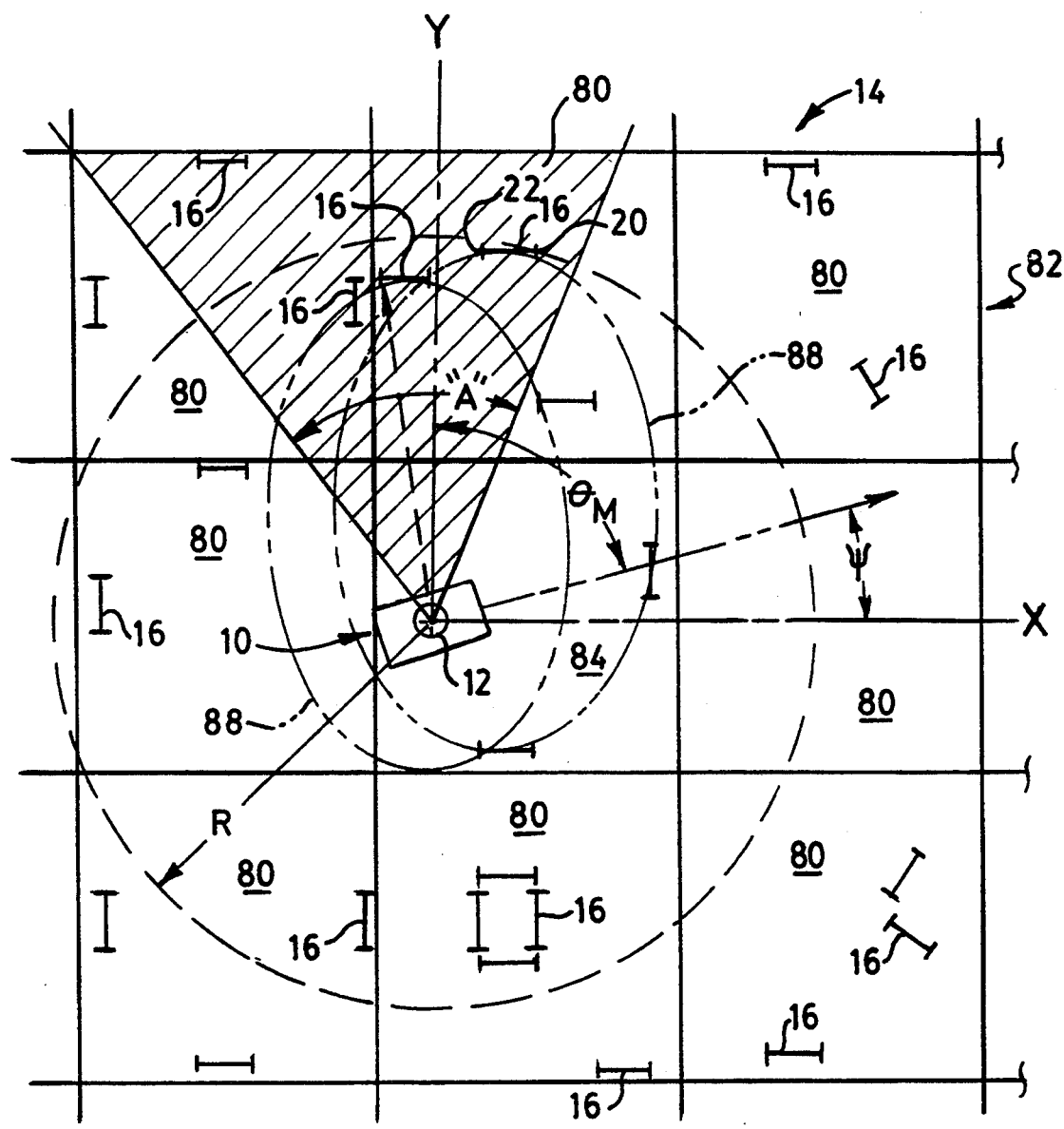
FIG. 6 is a diagrammatic coordinate plan of a portion of the operating area showing the position, and orientation of the anonymous targets, and the position and heading of the vehicle.

As best seen in FIG. 6, to reduce the number of anonymous targets 16 being considered as plausible targets, the area 14 of operation of the vehicle 10 is broken up into discrete areas, an initial square 84 (the square in which the vehicle is located) and a plurality of sequentially adjacent squares 80 together forming a grid 82. This information is stored in a list in computer 52. Knowing the position of the vehicle 10 and the square which the vehicle occupies, a sublist is formed. Only anonymous targets 16 in the initial square 84 and the eight adjacent boundary squares 80 are to be considered as plausible targets 16. All other squares 80 are eliminated from processing. A new sublist is created each time the vehicle 10 passes the boundary of the initial square 84. The location of the vehicle 10 used in this process is based on an estimated position of the vehicle 10. The estimated vehicle 10 position is based on dead reckoning calculations which reflects the position of the vehicle 10 based on dead reckoning signals, as corrected by previous laser scanner measurements.

To further reduce the number of plausible anonymous targets 16 a quadrant test is performed. This test considers the heading $\Psi$ of the vehicle 10 and the measured bearing $\Theta m$ of the scanner 16. Only those targets 16 located within the initial square 84, the square in which the vehicle is located, and up to three adjacent squares based on the measured bearing of the scanner 16 are considered. For the bearing of the scanner shown in FIG. 6, the three adjacent squares are those squares in which a portion of the square lies within the shaded area defined by angle "A". Angle "A" is the tolerance range afforded to scanner bearing error relative to vehicle bearing $\Psi$. In the particular example the tolerance range is 10 degrees. Given an anonymous target 16 sighting the proposed logic considers: if the target 16 is at scanner bearing angle $\Theta m$ could that target be possibly located in the square of question, is the target located at scanner bearing angle $\Theta m$ within the preselected tolerance spread indicated above. If the answer is yes further subsequent tests are applied. If the answer is no the next target in the list is considered and the instant target is dropped from further consideration.

To further reduce processing time a range test is performed by the computer 52. Only those anonymous targets 12 located within a radius "r" from a preselected point on the vehicle 10, based on the vehicle scanner 12 range, are considered. The magnitude of this range is approximately 49.2 feet (15 meters). The plausible targets within this radius are based on the estimated position of the vehicle 10 and the stored position of the anonymous targets 12 in memory. The range is calculated by computer 52 according to the following equation:

$$r = \sqrt{(X_T - X_V)^2 + (Y_T - Y_V)^2}$$

where r=range; $X_T, Y_T$=measured coordinate position of target and $X_v, Y_v$=estimated coordinate position of vehicle If the range "r" of the target is located at a distance greater than the preselected distance indicated above the anonymous target 16 is eliminated from further processing. If the target 16 is within the predetermined range the next test (angle test) is conducted.

The bearing angles of the anonymous targets 16 relative to the vehicle 10 are estimated by computer 52 based on the estimated position $X_v, Y_v$ and heading $\Psi$ of the vehicle 10, determined by dead reckoning, and predetermined anonymous target locations $X_T, Y_T$ previously downloaded from the land base computer 50 and stored in the memory of computer 52.

The scanner 12, rotating at more than 100 revolutions per minute, delivers electromagnetic radiation and receives a reflection from a first anonymous target of the plurality of anonymous targets 16 as well as other anonymous targets 16. The scanner 12 delivers the scanner signal indicated above to the computer 52 for further processing based on the received reflection. It should be noted that the target position and subsequent bearing calculations are based on the location of the target second edge 22, the time at which the reflected electromagnetic radiation ceases to be received. The bearing angle of the first anonymous target 16 is measured at the instant the reflected electromagnetic radiation received from the first anonymous target 16 ceases.

Figure 7:
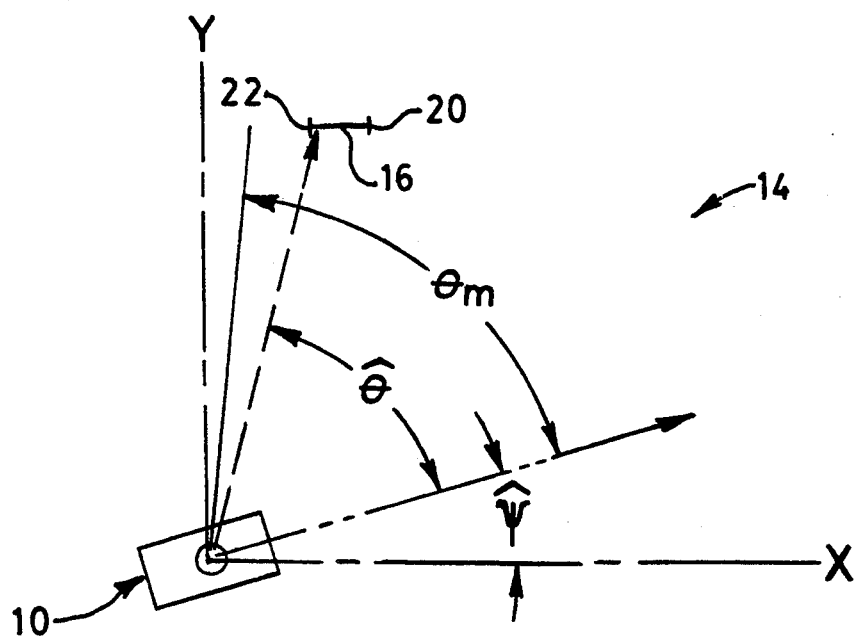
FIG. 7 is a diagrammatic showing of the relative coordinate position of the vehicle and first anonymous target.

Given an estimated vehicle position $X_v, Y_v$ and target position $X_T, Y_T$ the error between the estimated bearing $\theta$ to the first anonymous target 16 and the measured bearing $\Theta m$ to the first anonymous target 16 can be used to improve the accuracy of the estimated vehicle 10 position. The measured bearing angle $\Theta m$ of the first anonymous target 16 is compared with the estimated bearing angle $\theta$ of an associated one of the plurality of anonymous targets 16 and verified that the measured bearing angle $\Theta m$ of the first anonymous target 16 is within a preselected bearing angle association limit $\alpha$ of the estimated bearing angle $\theta$ of the one associated anonymous target 16. As best seen in FIG. 7, the estimated bearing angle $\theta$ is calculated as follows:

$$\theta = \arctan\left(\frac{Y_t - Y_V}{X_T - X_V}\right) - \psi$$

The comparison between the measured and estimated bearing angles is determined as follows:

$$||\theta m - \theta|| < \alpha$$

For the first anonymous target 16 to be plausible the angle association limit $\alpha$ is within a range of 3 to 30 degrees. This is based on the largest acceptable error in vehicle position estimates based on dead reckoning and actual target position error. Should the difference between the measured and estimated bearing angle exceed the angle association limit $\alpha$ the test has failed and the anonymous target 16 is eliminated from further consideration. If the angle association test is passed the next test (incident angle test) is conducted.

Figure 8:
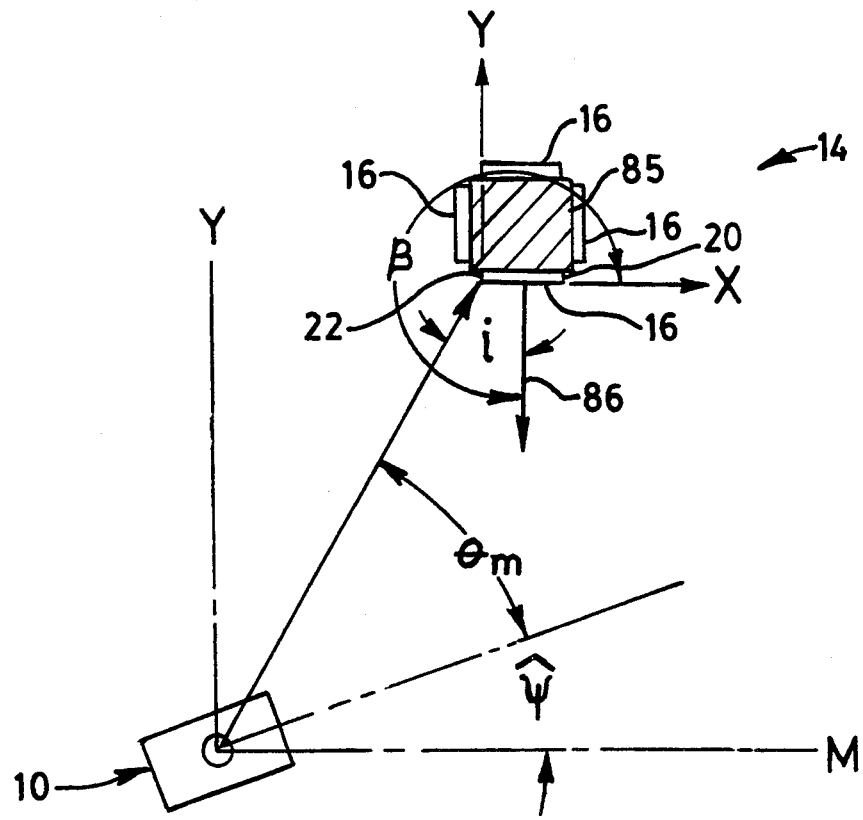
FIG. 8 is a diagrammatic showing of the relative coordinate position of the vehicle and a plurality of anonymous targets mounted on a post.

Referring to FIG. 8, the incident angle test is provided to further improve the accuracy of association of the first sensed anonymous target 16 and further improve accuracy in the navigation of the vehicle 10. The incident angle test considers the orientation of the anonymous targets 16 and facilitates distinguishing between closely grouped anonymous targets 16. Thus, the incident angle test allows the anonymous targets 16 to be close to each other, such as on a common pillar 85, provided the anonymous targets are oriented at different angles. The incident angle test is based on the premise that for an estimated vehicle position and heading one can determine which of the plurality of closely grouped anonymous targets 16 is oriented in a direction capable of reflecting electromagnetic radiation to the scanner 12. Conversely, the incident angle test also eliminates those of the closely grouped anonymous targets 16 which are oriented at an angle such that they are not capable of reflecting electromagnetic radiation back to the scanner 12.

The incident angle of the first anonymous target 16 is thus calculated as a function of a selected one of the measured and estimated bearing angles $\theta, \theta m$, the orientation $\beta$ of a related anonymous target 16 stored in a target file in memory, and an estimated heading $\Psi 0$ of the vehicle 10 based on dead reckoning. Since the difference in measured $\Theta m$ and estimated $\theta$ bearing angles, is substantially small either the measured or estimated bearing angle $\theta m, \theta$ may be used in determining the incident angle "i". The difference is small since the previous angle test has eliminated those outside of the previously determined bearing angle. The measured bearing angle $\Theta m$ is calculated as follows:

$$i = \beta - \pi - \theta m - \psi$$

if $i > 180°$ $i = i - 360°$
if $i < -180°$ $i = i + 360°$
$i = abs(i)$

The calculated incident angle "i" is then compared with a predetermined incident angle maximum value "$i_{max}$". The predetermined incident angle maximum value "$i_{max}$" is the maximum angle, relative to a line normal to the first anonymous target, at which the first anonymous target 16 satisfactorily reflects electromagnetic radiation back to the scanner 12. It has been found that for a substantially flat anonymous targets that "$i_{max}$" < 50 degrees. Should the test fail, the calculated incident angle being greater than the maximum predetermined incident angle, the anonymous target 16 is eliminated from further consideration. If the incident angle test is passed the next test, the subtended angle test, is conducted.

As best seen in FIG. 6, each of the anonymous targets 16 has a predetermined region of reflected light having a boundary 88 determined by the maximum subtended angle of reflection and the range of scanner 10. The boundary 88 is somewhat teardrop shaped and suitable for navigation purposes for a vehicle 10 within its boundary 88. For example, the first anonymous target 16 is capable of reflecting electromagnetic radiation to the scanner 12 whenever the vehicle 10 is within the boundaries 88 of the scanner 12. As a result, the step of determining the position of the vehicle 10 being within the region of reflection of the first target 16 is achievable given the estimated position of the vehicle 10 and one of the estimated locations of the first anonymous target 16. It should be recognized that this test is somewhat redundant to the incident angle test and may be omitted when the incident angle test is performed. As with the other tests, further target association tests are performed on the first target 16 only when the instant test is passed.

Figure 9:
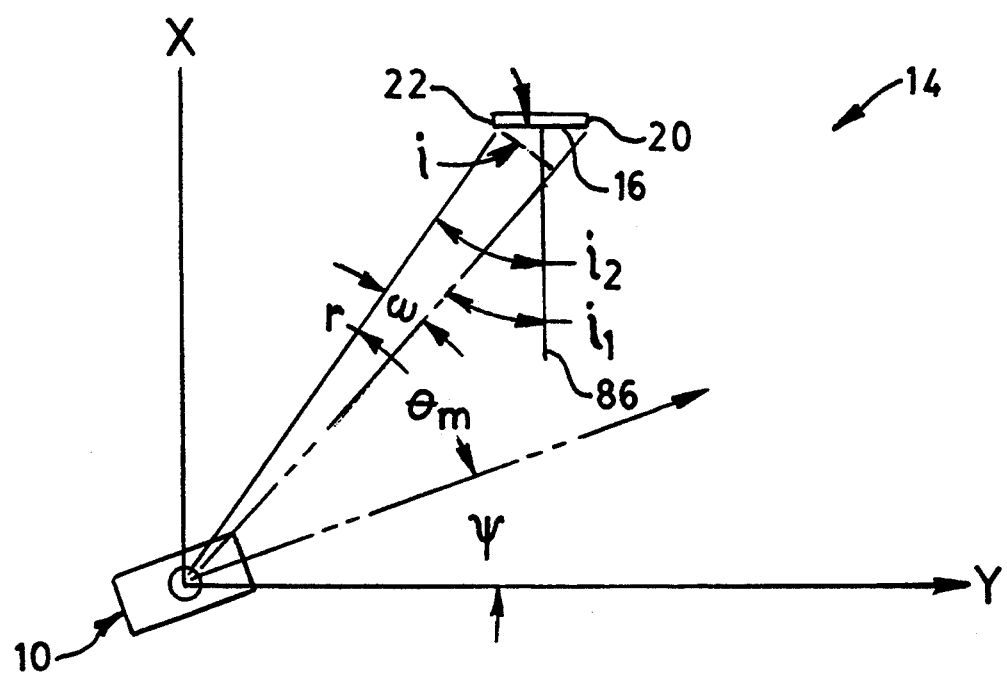
FIG. 9 is a diagrammatic showing of the relative coordinate position of the vehicle and first anonymous target.

As shown in FIG. 9, it is possible to further determine the validity of the previously made association between the first anonymous target 16 and the associated anonymous target 16 stored in memory by measuring a subtended angle $\omega$ or width of the first anonymous target 16 reflecting the electromagnetic radiation, comparing the measured subtended angle $\omega$ with an estimated subtended angle $\omega$, and determining if the measurement lies within an acceptable range of tolerances of the estimated subtended angle $\omega$. The measured subtended angle $\omega$ of the first anonymous target 16 is achieved by sensing the first and second edges 20, 22 of the first anonymous target 16 as the scanner rotates in a counter-clockwise direction. A reflection of the first anonymous target 16 is received by the scanner during the period when the delivered beam is between the first and second edges 20, 22. The measured subtended angle $\omega$ of the first anonymous target 16 is a function of the data count and marker signals delivered from the scanner angle sensing means 44 to the navigation processor portion 66. The measured width of the first anonymous target 16 may be derived from the measured subtended angle $\omega$ of the first anonymous target 16. Since the subtended angle and width analysis produces equivalent results only the subtended angle analysis will be discussed in detail. It is recognized that the width analysis is easily ascertained by one skilled in the art given an understanding of the subtended angle analysis.

The estimated subtended angle $\omega$ of the first anonymous target 16 is calculated based on the estimated position and heading of the vehicle 10 as follows:

$$\omega = \frac{w}{r} \cos i$$

where W=width of the target, r=distance from the vehicle to the target, and the i=incident angle of the first target. The anonymous target width (W) has been selected as 45 mm (1.77 inches). Since the targets 16 are relatively narrow in width, and the distance r is relatively large in comparison to the target width, the incident angles $i_1$ and $i_2$ at the first and second edges 20, 22 (leading and trailing edges) are approximately equal to each other and incident angle "i" determined above.

The measured subtended angle $\omega$ and estimated subtended angle $\omega$ are compared as follows:

$$\omega > K_0 W - K_1$$

$$\omega < K_2 W + K_3$$

where $K_0$, $K_1$, $K_2$, and $K_3$ are predetermined constants.

Constants K1 and K3 consider transition zones defined at the first and second edges 20, 22 and reflective signal error introduced at these zones. Constants $K_0$ and $K_2$ consider the greatest percentage amount of acceptable error in the lower and upper limits of the measured subtended angle $\omega$. It has been determined that $K_0=0.85$, $K_2=1.15$, and $K_1$ and $K_2=0.02$ degrees. If the estimated subtended angle $\omega$ is within an acceptable tolerance range as determined above the test will pass and the computer 52 will store the identity of the first anonymous target 16 in a plausible target list of the computer 52. If the test fails, the measurement will be discarded and not used to correct the estimated position and heading of the vehicle 10. If there is only one plausible target 16, then the measurement will be used to correct the vehicle position and heading estimate on the assumption that the measurement came from the related target in memory. If there is more than one plausible target, the association algorithm enters a second stage.

For each anonymous target 16 in the list of plausible anonymous targets 16, the knowledge of the uncertainty in vehicle position and heading estimate, and of the accuracy of the bearing measurement is used to form a variance for the bearing measurement prediction. A normalized squared innovation (NSI) is then the ratio of the square of the bearing measurement prediction error to the variance of the bearing measurement prediction. The measurement is then associated with the anonymous target 16 which yields the smallest value of the normalized square innovation. The normalized squared innovation for the chosen target is required to be smaller than the normalized squared innovation for any other anonymous target in the list of plausible targets by a sufficient margin. If this is not the case, then the measurement is rejected, otherwise the bearing measurement and the chosen anonymous target 16 are used to correct the vehicle position and heading estimate.

The normalized square innovation is calculated as follows:

$$\zeta = \frac{(\theta m - \theta)^2}{S}$$

where $\Theta m$ is the measured bearing angle of the target, $\theta$ is the estimated bearing angle of the target, and S is the measurement prediction variance.

Therefore, the normalized squared innovation $\zeta_1$ of the first anonymous target 16 and a normalized squared innovation $\zeta n$ of each of the other targets stored in the plausible target list is calculated in accordance with the above noted equation. The normalized squared innovation $\zeta_1$ of the first anonymous target 16 is compared with the normalized squared innovation $\zeta n$ of the plurality of anonymous targets 16. A signal is delivered to the guidance processor portion 68 and the vehicle position and heading is corrected in response to the normalized square innovation of the first anonymous target 16 being smaller that the normalized square innovation of each of the plurality of anonymous targets 16 stored in plausible target list. It is to be noted that the normalized square innovation of the first anonymous target 16 provided the best of the acceptable $\zeta$ and that the $\zeta_1$ of the first anonymous target was less than a preselected value, for example, 30.

Figure 10C:
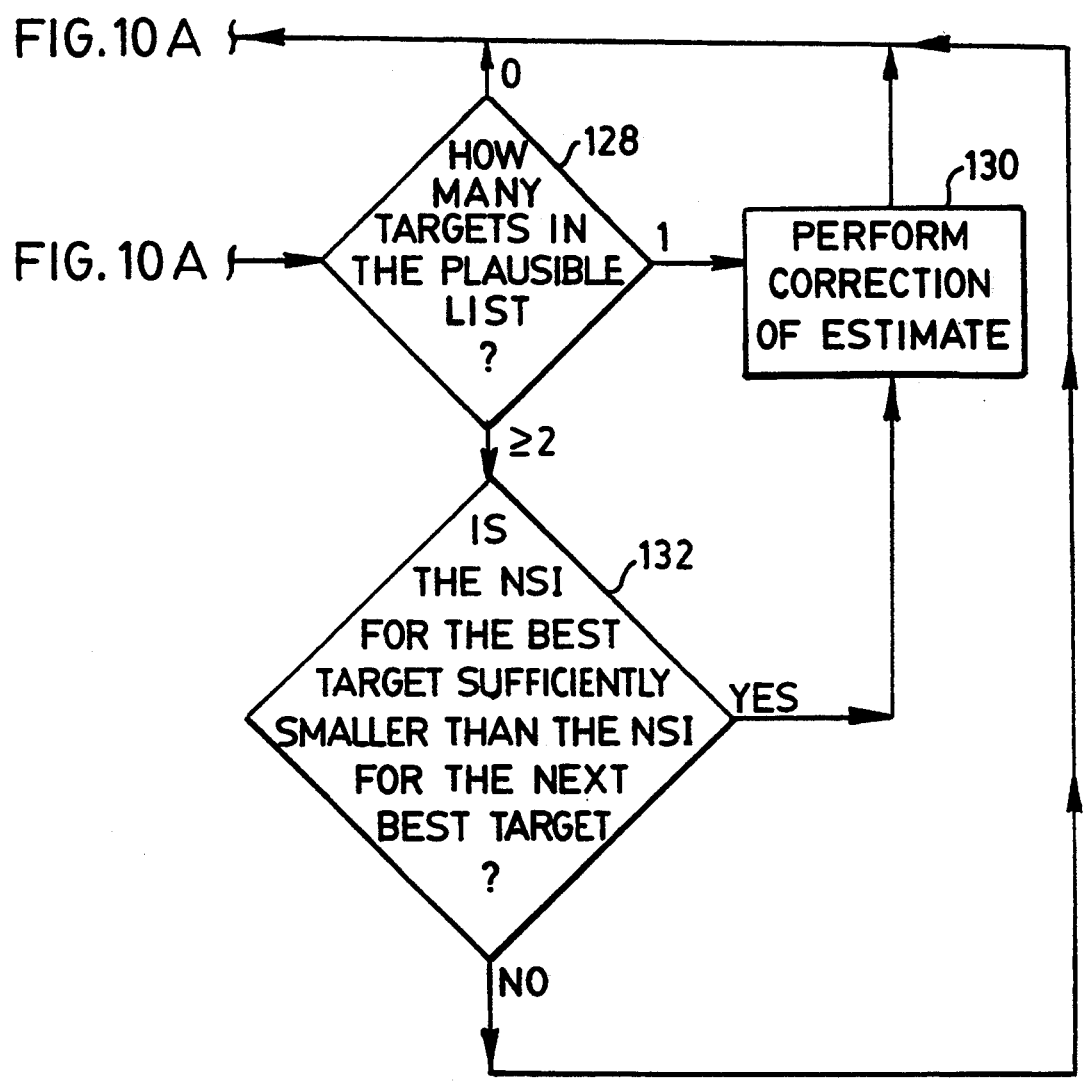

With reference to FIGS. 10A, 10B, and 10C, a flow chart of the algorithm above analysis is provided. Since the target association was described above in substantial detail only a brief overview of the analysis will be provided.

As shown in box 100, the position of the vehicle 10, is initialized. This is achieved, as described above, for example, by placing the vehicle 10 at a preselected position within the area 14 of operation of the vehicle 10, scanning the area 14 by the laser scanner 12, and establishing the initial position and heading of the vehicle 10 in the computer 52 based on target reflections. The steps of target association described above may be performed during initialization.

As shown in box 102, a sublist of squares 80, is prepared from a list of squares 80 covering the entire area 14 of operation of the vehicle 10. The list of squares contains all targets and the sublist of squares 80 includes the coordinate position and orientation of each anonymous target 16 in a 9 square neighborhood. The sublist of squares 80 is updated as the vehicle 10 traverses the underlying terrain and passes the boundary of an initial square 84, the square occupied by the vehicle 10, and those squares adjacent to the initial square 84. The sublist of squares 80 includes the initial square 84 and eight (8) adjacent boundary squares. Any anonymous target 16 not located with in the sublist of squares 80 is eliminated from consideration as a plausible target 16.

Referring to box 104, the scanner 12 delivers electromagnetic radiation, and receives a reflection of the electromagnetic radiation from a first one of the anonymous targets 16. A square 80 is taken from the sublist of squares 80 (box 106). The bearing angle of the scanner 12, based on feedback from encoder means 44, at the time of the reflection, and the heading and location of the vehicle 10, based on deadreckoning as corrected by previous laser measurements is information required to perform the square test (quadrant test) indicated in box 108. The square test considers the measured bearing angle $\Theta m$ of the first anonymous target 16 and determines if the first anonymous target 16 could be located in the square of question. If the square test is passed a next target 16 is taken from the sublist of targets 16. If the square test fails the computer 52 determines if there are any more squares 80 in the sublist of squares (box) and processes the data as discussed above, by performing the square test on the next square 80. If there are no more squares 80 in the sublist of squares 80 and there is only one anonymous target 16 a correction of the estimated position and heading is made in computer 52. The correction results in signals being delivered to the steering and drive systems 64, 62 to correct the position and heading of the vehicle 10.

As indicated above, should the square test for the first anonymous target 16 pass the square test the computer 52 takes the next target from the list of targets in this square (box 110). The range test (box 112) discussed above is then performed on the individual (first) anonymous target 16. If the first anonymous target 16 is outside the predetermined set range (distance) and there are no more targets in the square (box 126) the step in box is then executed.

Assuming the first anonymous target 16 passes the range test of box 112, the angle test is then performed on the above first anonymous target. Since the angle test was described in detail above no detailed description of the analysis will be made. Should the first anonymous target 16 angle analysis be successful the next test, the incident angle test of box 116 is performed as described in detail in the earlier description. Given the successful passing of the incident angle test of box 116 the subtended angle test described above and indicated in box 118 is executed in the computer 52, as is the other tests. Should the subtended angle test be successful the first anonymous target is tested under the normalized square innovation validation gate analysis (NSI) of box 120 described in detail above. Should the first anonymous target 16 pass the NSI analysis of box 120 and be of an acceptable value the first anonymous target identity will be entered into a plausible list of targets. It should be recognized from an inspection of the algorithm disclosed in FIGS. 10A, 10B, and 10C that if any of the tests of the executable steps of boxes 112, 114, 116, 118, and 120 fail to pass the step as set forth in box 126 is executed.

As shown in the algorithm of 10B, 10C, and box 128, should the number of anonymous targets 16 passing all of the tests be more than one, the NSI of the anonymous target 16 providing the best NSI is compared with the target providing the second best NSI. If the NSI for the best target 16 is sufficiently smaller than the NSI for the second best target by a preselected amount then the estimated vehicle position is corrected based on the validity of the first anonymous target.

Industrial Applicability

With reference to the drawings, the onboard computer 52, during initialization of the vehicle 10 location and during operation of the vehicle 10, processes the scanner signals received from the scanner 12, and the deadreckoning signals from the dead reckoning means 78, and corrects the position and heading of the vehicle 10 based on the fixed known position of the targets relative to the vehicle 10. Since the reflective targets 16 are unmarked and anonymous it is necessary to identify, with a high degree of accuracy, the anonymous target reflecting the electromagnetic radiation. To achieve the high degree of accuracy in anonymous target identification required, the computer 52, given the surveyed position of the anonymous targets 16 in memory and the bearing of a first one of the anonymous targets 16 reflecting electromagnetic radiation, the steps as disclosed above and shown in FIGS. 10A-C are executed in the computer 52. Knowing the identity of the first anonymous target 16 sensed with a substantial degree of accuracy improves the accuracy of the path of travel of the vehicle 10 and enables the vehicle to perform in applications having close tolerance requirements. Since the algorithm executed by the computer 52 has several steps requiring completion before the identity of the first anonymous target is confirmed the accuracy of the analysis is extremely high. Beneficially, should any steps of the analysis fail to provide an acceptable result, the identity of the anonymous target being compared will be eliminated as a plausible target 16 and thus saving unnecessary computing time.

Execution of the incident and subtended angle tests of FIGS. 8 and 9 by computer 52 provides the additional benefit of being able to utilize the uniqueness of the orientation and width of the anonymous target 16 to further improve the determination of anonymous target identity. Thus, the accuracy in identifying and verifying the first anonymous target 16 is raised to a new level.

The NSI analysis, as previously discussed, further improves the accuracy of verification of the identity of the first, second and other anonymous targets 16 and further eliminates the potential for erroneously correcting the path of travel of vehicle 10.

We claim:

1. A method for determining the identity of an observed anonymous target from a plurality of anonymous targets positioned at predetermined spaced apart locations within an area of operation of an automatic guided vehicle, said vehicle having a scanner and said scanner being adapted to deliver electromagnetic radiation, said targets having a substantially planar reflective upright surface and a predetermined width defined by spaced first and second upright edges, said targets each being oriented at a preselected angle relative to predetermined coordinates, said targets being adapted to reflect the delivered electromagnetic radiation and said scanner being adapted to receive said reflected electromagnetic radiation and deliver a signal in response to receiving said reflected electromagnetic radiation, said automatic guided vehicle having an onboard computer, said computer having memory, and said computer being adapted to process signals delivered from said scanner according to preprogrammed instructions, said predetermined location, orientation, and width of each anonymous target being stored in memory, said vehicle having dead reckoning means for sensing the position of the vehicle and delivering a responsive dead reckoning signal, said computer being adapted to receive said dead reckoning signal and process said dead reckoning signal according to preprogrammed instructions, said method comprising:

- estimating the position and heading of the vehicle based on dead reckoning signals;
- estimating a bearing angle of the anonymous targets relative to the vehicle based on the estimated position and heading of the vehicle and predetermined anonymous target locations and storing in memory the estimated bearing angles;
- delivering electromagnetic radiation and receiving a reflection of the delivered electromagnetic radiation from a first of the plurality of anonymous targets;

measuring the bearing angle of the first anonymous target as a function of reflected electromagnetic radiation received from the first anonymous target;

comparing the measured bearing angle of the first anonymous target with the estimated bearing angle of an associated one of the plurality of anonymous targets and verifying that the measured bearing angle of the first anonymous target is within a preselected bearing angle limit of the estimated bearing angle of the one associated anonymous target;

measuring one of a subtended angle and width of the first anonymous target reflecting said electromagnetic radiation;

calculating one of a subtended angle and width of the related anonymous target selected from memory as a function of the estimated vehicle position and the predetermined target position;

comparing one of the measured width and subtended angle of the first anonymous target with a respective one of the calculated width and subtended angle of the related anonymous target and verifying that the compared one of the width and subtended angle of the first anonymous target and related anonymous target being within a predetermined relative tolerance range of each other; and storing an identity of the first target in a plausible target list in said computer.

2. A method, as set forth in claim 1, including the steps of:

calculating an incident angle of reflection of the first anonymous target as a function of one of the measured and estimated bearing angles, the orientation of a related anonymous target stored in memory, and an estimated heading of the vehicle;

comparing the calculated incident angle with a predetermined incident angle maximum value; and preforming said one subtended angle and width calculations and measurements in response to said calculated incident angle being less than said incident angle maximum value.

3. A method, as set forth in claim 2, wherein said incident angle maximum value is 50 degrees.

4. A method, as set forth in claim 1, wherein the estimated subtended angle of the anonymous target is determined according to the calculation:

$$\omega = \frac{w}{r} \cos i$$

where $\omega$=estimated subtended angle, W=width of target, i=incident angle of reflection, and r=distance from vehicle to the target.

5. A method as set forth in claim 1, including the step of:

determining a normalized squared innovation of the first anonymous target and each of a plurality of targets stored in the plausible target list in accordance with the following equation:

$$\zeta = \frac{(\theta m - \theta)^2}{S}$$

where $\Theta m$=measured angle, $\theta$=estimated angle, and S=measurement prediction variance.

6. A method as set forth in claim 5, including the steps of:

comparing the normalized squared innovation of the first anonymous target with the plurality of anonymous targets; and delivering a signal to the guidance computer and correcting the vehicle position and heading in response to the normalized square innovation of the first anonymous target being smaller that the normalized square innovation of each of the plurality of anonymous targets stored in plausible target list.

7. A method as set forth in claim 1, wherein each of said targets having a predetermined region of reflected light and including the step of determining the position of said vehicle being within a region of reflection of the first target based on the estimated position of the vehicle and one of the measured and estimated bearings of the first target.

8. A method as set forth in claim 1, wherein the area of operation of the vehicle is divided into a plurality of discrete areas, said targets being located at preselected locations within said discrete areas, and including the step of considering only those targets located within discrete areas based on the position and heading of the vehicle.

9. A method, as set forth in claim 8, including the step of considering only those targets plausible that are located within a radius having a preselected magnitude, said radius being generated from a preselected point on the vehicle, and said plausible targets being based on the estimated position of the vehicle and the stored position of the targets in memory.

10. A method, as set forth in claim 1, wherein the estimated bearing angle of the related anonymous target is determined by the equation:

$$\theta = \arctan\left(\frac{Y_T - Y_V}{X_T - X_V}\right) - \psi$$

where $\theta$=estimated bearing angle, $Y_t$=known Y coordinate position of target, $Y_v$=estimated coordinate position of vehicle, $X_t$=known X coordinate position of target, $X_v$=estimated X coordinate position of vehicle, and $\omega$=estimated heading of vehicle.

11. A method, as set forth in claim 1, wherein the preselected bearing angle association limit is within a range of 3 to 30 degrees.

12. A method, as set forth in claim 1, wherein said scanner being rotatable to deliver said electromagnetic radiation in the form of a light beam in a direction outwardly from an axis of rotation of said scanner during rotation of said scanner at a predetermined speed about said axis, said scanner having a receiver, said receiver being adapted to receive a reflection of said beam, said scanner having a means for sensing the angle of rotation of the scanner, said method including the steps of:

receiving a reflection of said beam in response to said beam sweeping across said target between the first and second edges of said first target;

delivering a signal in response to receiving said reflection;

measuring the angle of rotation of said scanner beam; and determining the subtended angle of the first target based on the delivered signal and the measured angle of rotation of said scanner.

13. A method, as set forth in claim 1, wherein said dead reckoning means includes sensor means for sensing the direction and distance of travel of said vehicle.

14. A method, as set forth in claim 1, wherein the identity of the first anonymous target being stored in said plausible target list only in response to one of said subtended angle and width of the first anonymous target and respective subtended angle and width of the related anonymous target being within said predetermined relative tolerance range.

15. A method for verifying the identity of an observed anonymous target from a plurality of anonymous targets positioned at predetermined spaced apart locations within an area of operation of an automatic guided vehicle having a laser scanner, dead reckoning means, and an onboard computer having a memory, comprising the steps of:

estimating the position and heading of the vehicle based on dead reckoning;

estimating a bearing angle of the anonymous targets relative to the vehicle based on the estimated position and heading of the vehicle and the predetermined anonymous target locations, and storing in memory the estimated bearing angles;

scanning the area with a laser beam delivered from said laser scanner and receiving a reflection of the laser beam from a first anonymous target of the plurality of anonymous targets;

measuring the bearing angle of the first anonymous target as a function of the laser beam reflection;

comparing the estimated bearing angles of the anonymous targets with the measured bearing angle of the first target and verifying that the measured bearing angle of the first target is within a preselected bearing angle limit of the estimated bearing angle of a related one of the anonymous targets;

calculating an incident angle of reflection of the first anonymous target as a function of one of the measured and estimated bearing angles, the orientation of the related anonymous target stored in memory, and an estimated heading of the of the vehicle;

comparing the calculated incident angle with a predetermined incident angle maximum value;

measuring one of a subtended angle and width of the first anonymous target reflecting said electromagnetic radiation;

calculating one of a subtended angle and width of the related anonymous target selected from memory as a function of the estimated vehicle position and the predetermined target position;

comparing one of the measured width and subtended angle of the first anonymous target with a respective one of the calculated width and subtended angle of the related anonymous target and verifying that the compared one of the width and subtended angle of the first anonymous target and related anonymous target being within a predetermined relative tolerance range of each other; and storing an identity of the first target in a plausible target list in said computer.

16. A method, as set forth in claim 15, including the steps of:

estimating the position and heading of the vehicle based on dead reckoning;

estimating a bearing angle of the anonymous targets relative to the vehicle based on the estimated position and heading of the vehicle and the predetermined anonymous target locations, and storing in memory the estimated bearing angles;

scanning the area with a laser beam delivered from said laser scanner and receiving a reflection of the laser beam from a second anonymous target of the plurality of anonymous targets;

measuring the bearing angle of the second anonymous target as a function of the laser beam reflection;

comparing the estimated bearing angles of the anonymous targets with the measured bearing angle of the second anonymous target and verifying that the measured bearing angle of the second anonymous target is within a preselected bearing angle limit of the estimated bearing angle of a related one of the anonymous targets;

calculating an incident angle of reflection of the second anonymous target as a function of one of the measured and estimated bearing angles, the orientation of the related anonymous target stored in memory, and an estimated heading of the of the vehicle;

comparing the calculated incident angle with a predetermined incident angle maximum value;

measuring one of a subtended angle and width of the second anonymous target reflecting said electromagnetic radiation;

calculating one of a subtended angle and width of the related anonymous target selected from memory as a function of the estimated vehicle position and the predetermined target position;

comparing one of the measured width and subtended angle of the second anonymous target with a respective one of the calculated width and subtended angle of the related anonymous target and verifying that the compared one of the width and subtended angle of the second anonymous target and related anonymous target being within a predetermined relative tolerance range of each other; and storing an identity of the second anonymous target in a plausible target list in said computer.

17. A method, as set forth in claim 15, wherein said identity of the first anonymous target being stored in said plausible target list only in response to one of said subtended angle and width of the first anonymous target and respective subtended angle and width of the related anonymous target being within said predetermined relative tolerance range.

18. A method, as set forth in claim 15, wherein said identity of the first anonymous target being storable in said plausible target list only in response to the calculated incident angle of reflection of the first anonymous target being less than a preselected value and one of said subtended angle and width of the first anonymous target and respective subtended angle and width of the related anonymous target being within said predetermined relative tolerance range.

19. A method for verifying the identity of an observed anonymous target from a plurality of anonymous targets positioned at predetermined spaced apart locations within an area of operation of an automatic guided vehicle, said vehicle having a scanner and said scanner being adapted to deliver electromagnetic radiation, said targets having a substantially planar reflective upright surface and a predetermined width defined by spaced first and second upright edges, said targets each being oriented at a preselected angle relative to predetermined coordinates, said targets being adapted to reflect the delivered electromagnetic radiation and said scanner being adapted to receive said reflected electromagnetic radiation and deliver a signal in response to receiving said reflected electromagnetic radiation, said scanner having means for sensing the angular position of the scanner relative to the heading of the vehicle, said automatic guided vehicle having an onboard computer, said computer having memory, and said computer being adapted to process signals delivered from said scanner according to preprogrammed instructions, said predetermined location, orientation, and width of each anonymous target being stored in memory, said vehicle having dead reckoning means for sensing the position of the vehicle and delivering a responsive dead reckoning signal, said computer being adapted to receive said dead reckoning signal and process said dead reckoning signal according to preprogrammed instructions, said method comprising:

measuring one of a subtended angle and width of the first anonymous target reflecting said electromagnetic radiation;

calculating one of a subtended angle and width of a related anonymous target selected from memory as a function of the estimated vehicle position and the predetermined target position;

comparing one of the measured width and subtended angle of the first anonymous target with a respective one of the calculated width and subtended angle of the related anonymous target and verifying that the compared one of the width and subtended angle of the first anonymous target and related anonymous target being within a predetermined relative tolerance range of each other; and storing an identity of the first target in a plausible target list in said computer.

20. A method, as set forth in claim 19, including the steps of:

calculating an incident angle of reflection of the first anonymous target as a function of one of a measured and an estimated bearing angles of said target, the orientation of a related anonymous target stored in memory, and an estimated heading of the vehicle;

comparing the calculated incident angle with a predetermined incident angle maximum value; and performing said one subtended angle and width calculation and measurement in response to said calculated incident angle being less than said incident angle maximum value.

21. An automatic guided vehicle, comprising:

a plurality of anonymous targets positioned at predetermined spaced apart locations within an area of operation of the automatic guided vehicle, said targets each having a substantially planar reflective upright surface and a predetermined width defined by spaced first and second upright edges, said targets each being oriented at a preselected angle relative to predetermined coordinates, said targets being adapted to reflect the delivered electromagnetic radiation;

a scanner rotatable about an upright axis, said scanner delivering electromagnetic radiation, receiving a reflection of electromagnetic radiation, and delivering a signal in response to receiving said reflected electromagnetic radiation, encoder means for delivering an angle signal responsive to the rotated position of the scanner, said encoder means being connected to the scanner;

dead reckoning means for sensing the direction and distance of travel the vehicle and delivering a responsive dead reckoning signal;

a processor mounted onboard the vehicle and being connected to receive the signals from said scanner, encoder, and dead reckoning means, said processor having memory and being adapted to process signals delivered from the scanner, encoder, and dead reckoning means according to preprogrammed instructions, said predetermined location, orientation, and width of each anonymous target being stored in memory, said processor calculating one of a subtended angle and a width of a first anonymous target reflecting said electromagnetic radiation based on measurements of the scanner and encoder signals, calculating one of a subtended angle and width of a related anonymous target selected from memory as a function of the estimated vehicle position based on said signals from the dead reckoning means as corrected by previous laser scanner measurements, and comparing one of the measured width and subtended angle of the first anonymous target with a respective one of the calculated width and subtended angle of the related anonymous target and verifying that the compared one of the width and subtended angle of the first anonymous target and related anonymous target being within a predetermined relative tolerance range of each other, and storing an identity of the first target in a plausible target list in said memory.

22. An automatic guided vehicle, as set forth in claim 21, wherein said processor calculating an incident angle of reflection of the first anonymous target as a function of one of a measured bearing angle of the first anonymous target and an estimated bearing angle of said related anonymous target, the orientation of a related anonymous target stored in memory, and an estimated heading of the of the vehicle, comparing the calculated incident angle with a predetermined incident angle maximum value, and performing said one subtended angle and width calculation and measurement in response to said calculated incident angle being less than said incident angle maximum value.

23. A method for determining the identity of an observed anonymous target from a plurality of anonymous targets positioned at predetermined spaced apart locations within an area of operation of an automatic guided vehicle, said vehicle having a scanner and said scanner being adapted to deliver electromagnetic radiation, said targets having a substantially planar reflective upright surface and a predetermined width defined by spaced first and second upright edges, said targets each being oriented at a preselected angle relative to predetermined coordinates, said targets being adapted to reflect the delivered electromagnetic radiation and said scanner being adapted to receive said reflected electromagnetic radiation and deliver a signal in response to receiving said reflected electromagnetic radiation, said automatic guided vehicle having an onboard computer, said computer having memory, and said computer being adapted to process signals delivered from said scanner according to preprogrammed instructions, said predetermined location, orientation, and width of each anonymous target being stored in memory, said method comprising:

estimating the position and heading of the vehicle;

estimating a bearing angle of the anonymous targets relative to the vehicle based on the estimated position and heading of the vehicle and predetermined anonymous target locations;

storing in memory the estimated bearing angles;

delivering electromagnetic radiation and receiving a reflection of the delivered electromagnetic radiation from a first of the plurality of anonymous targets;

measuring a subtended angle of the first anonymous target reflecting said electromagnetic radiation;

calculating a subtended angle of the related anonymous target selected from memory as a function of the estimated vehicle position and the predetermined target position;

comparing the measured subtended angle of the first anonymous target with the subtended angle of the related anonymous target and verifying that the compared subtended angle of the first anonymous target and related anonymous target being within a predetermined relative tolerance range of each other; and storing an identity of the first target in a plausible target list in said computer.

24. A method, as set forth in claim 23, including the steps of:

calculating an incident angle of reflection of the first anonymous target as a function of one of the measured and estimated bearing angles, the orientation of a related anonymous target stored in memory, and an estimated heading of the vehicle;

comparing the calculated incident angle with a predetermined incident angle maximum value; and executing said subtended angle calculation and measurement in response to said calculated incident angle being less than said incident angle maximum value.

* * * * *